United States Patent
Park

(10) Patent No.: US 9,087,624 B2
(45) Date of Patent: Jul. 21, 2015

(54) DIELECTRIC COMPOSITION

(71) Applicant: SAMSUNG ELECTRO-MECHANICS CO., LTD., Suwon-si, Gyeonggi-do (KR)

(72) Inventor: Jeong Hyun Park, Busan (KR)

(73) Assignee: SAMSUNG ELECTRO-MECHANICS CO., LTD., Suwon-Si, Gyeonggi-Do (KR)

( * ) Notice: Subject to any disclaimer, the term of this patent is extended or adjusted under 35 U.S.C. 154(b) by 0 days.

(21) Appl. No.: 14/135,361

(22) Filed: Dec. 19, 2013

(65) Prior Publication Data

US 2014/0179508 A1  Jun. 26, 2014

(30) Foreign Application Priority Data

Dec. 20, 2012  (KR) .................. 10-2012-0149572

(51) Int. Cl.
*C04B 35/462* (2006.01)
*H01G 4/10* (2006.01)
*H01B 3/12* (2006.01)
*C04B 35/46* (2006.01)
*H01G 4/12* (2006.01)

(52) U.S. Cl.
CPC . *H01B 3/12* (2013.01); *C04B 35/46* (2013.01); *H01G 4/1218* (2013.01)

(58) Field of Classification Search
CPC ......... C04B 35/46; H01G 4/1218; H01B 3/12
See application file for complete search history.

(56) References Cited

U.S. PATENT DOCUMENTS 5,872,071 A  2/1999  Jean et al.

*Primary Examiner* — Karl Group
(74) *Attorney, Agent, or Firm* — McDermott Will & Emery LLP

(57) ABSTRACT

Disclosed herein is a dielectric composition including: a dielectric ceramic represented by the following equation: $X_2Y_2Ti_4O_{12}$ (wherein X is Li, or Na, and Y is Nd, Sm or Bi); and any one additive selected from $BaZ_2Ti_4O_{12}$ (wherein Z is Nd, Sm or Bi), $(Ti_{0.55}Zn_{0.15}A_{0.3})O_2$ (wherein A is Ta or V), $CaTiO_3$, and $TiO_2$.

11 Claims, 2 Drawing Sheets

US 9,087,624 B2

DIELECTRIC COMPOSITION

CROSS REFERENCE(S) TO RELATED APPLICATIONS

This application claims the benefit under 35 U.S.C. Section 119 of Korean Patent Application Serial No. 10-2012-0149572, entitled "Dielectric Composition" filed on Dec. 20, 2012, which is hereby incorporated by reference in its entirety into this application.

BACKGROUND OF THE INVENTION

1. Technical Field

The present invention relates to a dielectric composition, and more particularly, to a dielectric composition usable in a microwave band.

2. Description of the Related Art

A frequency used in communication components has been currently expanded to a microwave band due to development in technology in an information and communication field such as mobile communication and satellite broadcasting. The microwave refers to an electromagnetic wave in the frequency range of 300 MHz to 300 GHz, and an expansion to the microwave band is inevitably required in order to overcome a limitation in a usage frequency and allow larger demands as kinds and amounts of information become increased.

In order to achieve elements such as a duplexer, an LC filter, and the like, in the microwave band, since concept of a distributed circuit utilizing a λ/4 length is used, a dielectric composition having a dielectric constant of 15 to 100 and a high quality coefficient is needed. Examples of the representative dielectric composition include $ZrO_2$—$SnO_2$—$TiO_2$ and BaO—$TiO_2$ compositions having a dielectric constant of 40, and the dielectric compositions are used as the LC filter, or the like by applying a low temperature co-fired ceramic (LTCC) technology thereto.

The LTCC technology, which is a technology in which a dielectric ceramic is fired at a temperature of 950° C. or less by adding a low temperature sintering agent thereto, has an advantage in that Ag or Cu having excellent electric conductivity is usable as internal electrodes, and has the ultimate goal of three dimensional complex module having various passive components embedded therein.

A low temperature sintering oxide such as $B_2O_3$ or CuO has been mainly applied to the dielectric composition such as BaO—$Bi_2O_3$—$Nd_2O_3$—$TiO_2$, $BaTi_4O_9$, $Ba_2Ti_4O_20$, (Mg, Ca)$TiO_2$, or (Zr, Sn)$TiO_4$, having a temperature coefficient of resonant frequency of a value near 0 ppm/° C.

In particular, U.S. Pat. No. 5,872,071 discloses that $BaCuO_2$—CuO, the low temperature sintering agent, is added to a (Zr, Sn)$TiO_4$ composition having a dielectric constant of 40 in a range of 0.1 to 50 wt % to decrease a sintering temperature to be 1000° C. or less, wherein the dielectric constant is 35 to 40 and a quality coefficient (Q×f) is 7,000 to 35,000 GHz.

However, when reviewing the existing microwave dielectric compositions, the dielectric compositions having the dielectric constant of 50 or more, and in particular, 70 or more are rare, a BaO—$Bi_2O_3$—$Nd_2O_3$—$TiO_2$ composition or a BaO—PbO—$Nd_2O_3$—$TiO_2$ composition has been developed as a representative composition having the dielectric constant of 70 or more; however, has a problem in that PbO or $Bi_2O_3$ which is environmentally harmful is applied thereto.

RELATED ART DOCUMENT

Patent Document (Patent Document 1) U.S. Pat. No. 5,872,071

SUMMARY OF THE INVENTION

An object of the present invention is to provide a dielectric composition usable in a microwave band, having a high quality coefficient of 2,000 GHz or more, and useful for a low temperature co-fired ceramic (LTCC) resonator filter or an LC filter by having a low temperature sintering agent added thereto.

According to an exemplary embodiment of the present invention, there is provided a dielectric composition including: a dielectric ceramic represented by the following equation: $X_2Y_2Ti_4O_{12}$ (wherein X is Li, or Na, and Y is Nd, Sm or Bi); and any one additive selected from $BaZ_2Ti_4O_{12}$ (wherein Z is Nd, Sm or Bi), $(Ti_{0.55}Zn_{0.15}A_{0.3})O_2$ (wherein A is Ta or V), $CaTiO_3$, and $TiO_2$.

The dielectric ceramic represented by the following equation: $X_2Y_2Ti_4O_{12}$ (wherein X is Li or Na, and Y is Nd, Sm, or Bi) may have a dielectric constant of 70 or more and a negative (−) temperature coefficient of resonant frequency.

The additive may have a dielectric constant of 70 or more and a positive (+) temperature coefficient of resonant frequency.

At least one selected from $Li_2TiO_4$, $CaSiO_3$, $ZnTiO_3$, $ZnTiO_4$, $LiBO_2$, $Li_2SiO_3$, $ZnSiO_3$, $Zn_2SiO_4$, $BaTi_4O_9$, and $Ba_2TiO_4$ may be precipitated as a secondary phase of the dielectric composition.

The dielectric ceramic represented by the following equation: $X_2Y_2Ti_4O_{12}$ (wherein X is Li or Na and Y is Nd, Sm or Bi) may be included in a content of 20 to 70 mole %, and the additive may be included in a content of 30 to 80 mole %.

The dielectric composition may further include a low temperature sintering agent.

The low temperature sintering agent may be included in a content of 5 to 20 wt % based on the total dielectric composition and may be a glass frit.

The low temperature sintering agent may include $SiO_2$ and $B_2O_3$ in a sum content of 35 mole % or more, $Li_2O$ in a content of 10 to 48 mole %, ZnO in a content of 1 to 15 mole %, $Al_2O_3$ in a content of 0 to 5 mole %, and at least one of CaO and BaO in a content of 1 to 39 mole %.

The dielectric composition may be prepared by performing a low temperature co-fired ceramic (LTCC) process at a temperature range of 825 to 950° C. for 1 to 2 hours.

The dielectric composition may be used in a microwave band having a frequency range of 300 MHz to 300 GHz.

A dielectric constant may be in a range of 40 to 95, a quality coefficient may be in a range of 2,000 to 6,000 GHz, and a temperature coefficient of resonant frequency may be in a range of −30 to +30 ppm/° C.

DESCRIPTION OF THE PREFERRED EMBODIMENTS

Figure 1:
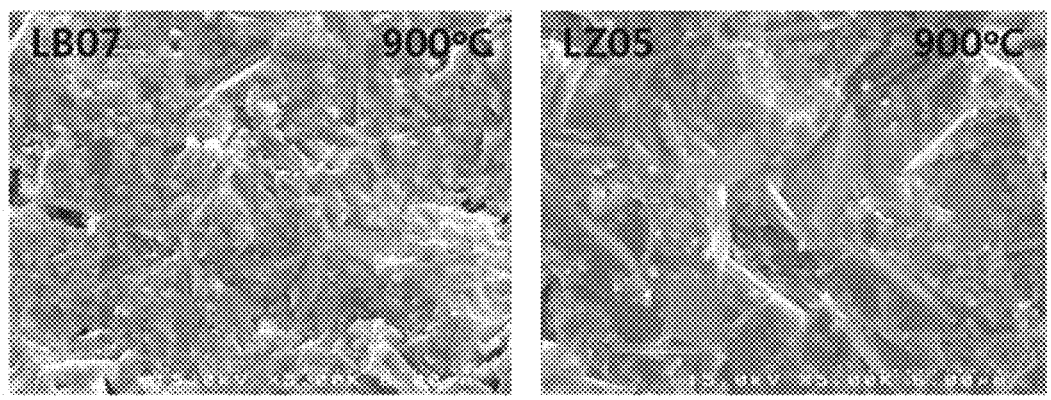
FIG. 1 is scanning electron microscope (SEM) photographs showing microwave dielectric compositions (LB07 and LZ05)

Hereinafter, the present invention will be described in more detail.

Terms used in the present specification are used for explaining specific embodiments rather than limiting the present invention. Unless explicitly described to the contrary, a singular form may include a plural form in the present specification. The word "comprise" and variations such as "comprises" or "comprising," will be understood to imply the inclusion of stated constituents, steps, operations and/or elements but not the exclusion of any other constituents, steps, operations and/or elements.

A dielectric composition according to an exemplary embodiment of the present invention may include: a dielectric ceramic represented by the following equation: $X_2Y_2Ti_4O_{12}$ (wherein X is Li, or Na, and Y is Nd, Sm or Bi); and any one additive selected from $BaZ_2Ti_4O_{12}$ (wherein Z is Nd, Sm or Bi), $(Ti_{0.55}Zn_{0.15}A_{0.3})O_2$ (wherein A is Ta or V), $CaTiO_3$, and $TiO_2$.

The dielectric ceramic represented by the following equation: $X_2Y_2Ti_4O_{12}$ (wherein X is Li or Na, and Y is Nd, Sm, or Bi) (LNT) in the dielectric composition according to the exemplary embodiment of the present invention has a high dielectric constant of 70 or more and a negative (−) temperature coefficient of resonant frequency.

In addition, the dielectric ceramic may improve dielectric properties and sintered properties through substitution with elements having the same electron value at each cation site. For example, in the case in which Li in $Li_2Nd_2Ti_4O_{12}$ is substituted with Na, the temperature coefficient of resonant frequency may have a positive (+) value depending on a substituted amount. In addition, in the case in which Nd in $Li_2Nd_2Ti_4O_{12}$ is substituted with Sm or Bi, a quality coefficient may be improved.

The dielectric ceramic may be included in a content of 20 to 70 mole % based on the total dielectric composition, and in the case in which the content of the dielectric ceramic is less than 20 mole %, a phase decomposition is badly generated to deteriorate the sintering and dielectric properties, which is not preferred, and in the case in which the content of the dielectric ceramic is more than 70 mole %, the temperature coefficient of resonant frequency among the dielectric properties is not capable of being near to 0 ppm/° C.

In addition, the additive having high dielectric constant of 70 or more and a positive (+) temperature coefficient of resonant frequency is included in the dielectric ceramic according to the exemplary embodiment of the present invention, such that the dielectric constant, the quality coefficient, and the temperature coefficient of resonant frequency may be controlled depending on change in crystalline phases.

The additive according to the exemplary embodiment of the present invention is any one additive selected from $BaZ_2Ti_4O_{12}$ (wherein Z is Nd, Sm or Bi) (BNT), $(Ti_{0.55}Zn_{0.15}A_{0.3})O_2$ (wherein A is Ta or V) (TZN), $CaTiO_3$, and $TiO_2$.

The additive may be included in a content of 30 to 80 mole % based on the total dielectric composition, and in the case in which the content of the additive is less than 30 mole %, the temperature coefficient of resonant frequency is not capable of being near to 0 ppm/° C., which is not preferred, and in the case in which the content of the additive is more than 80 mole %, the temperature coefficient of resonant frequency is near to 0 ppm/° C. which is not stable but rapidly increased in a positive (+) value.

Each additive may also improve the dielectric properties and the sintered properties through substitution with elements having the same electron value at each cation site. For example, in the case in which Nd in $BaNd_2Ti_4O_{12}$ is substituted with Sm or Bi, the quality coefficient may be improved. In addition, in the case in which Nb in $(Ti_{0.55}Zn_{0.15}Nb_{0.3})O_2$ is substituted with Ta, the dielectric properties are improved, and in the case in which Nb in $(Ti_{0.55}Zn_{0.15}Nb_{0.3})O_2$ is substituted with V, a sintering process may be performed at a relatively decreased temperature.

The substitution method of each element is performed in a scheme in which $Na_2O$, $Sm_2O_3$, $Ta_2O_5$, and $V_2O_5$ in predetermined amounts are weighed and mixed in a raw powder mixing process before synthesizing the dielectric composition.

In addition, according to the exemplary embodiment of the present invention, a small amount of low temperature sintering agent is additionally added to the dielectric composition, such that a microwave dielectric composition for low temperature co-fired ceramic (LTCC) in which a firing process is capable of being sintered at a low temperature of 950° C. or less and the dielectric properties thereof are excellent may be provided.

Since a glass frit has generally a negative (−) temperature coefficient of resonant frequency, the low temperature sintering agent having a positive (+) temperature coefficient of resonant frequency is applied to the dielectric composition, such that the dielectric composition may have a stable temperature coefficient of resonant frequency.

The low temperature sintering agent according to the exemplary embodiment of the present invention is preferably the glass frit, and may be included in a content of 5 to 20 wt % based on the total dielectric composition. In the case in which the content of the low temperature sintering agent is less than 5 wt %, a liquid phase sintering behavior is not sufficiently generated, and in the case in which the content of the low temperature sintering agent is more than 20 wt %, the dielectric properties such as the dielectric constant of the dielectric layer are significantly deteriorated, which is not preferred.

The glass frit used as the low temperature sintering agent of the exemplary embodiment of the present invention is used together with at least one of CaO, BaO and ZnO which are alkali earth oxides rather than using alkali $Li_2O$ or $Na_2O$ in a large amount in order to simply decrease a melting point, and $Al_2O_3$ in a small amount is used in order to maintain durability and chemical stability of the glass.

That is, it is preferred that the low temperature sintering agent according to the exemplary embodiment of the present invention includes $SiO_2$ and $B_2O_3$ in a sum content of 35 mole % or more, $Li_2O$ in a content of 10 to 48 mole %, ZnO in a content of 1 to 15 mole %, $Al_2O_3$ in a content of 0 to 5 mole %, and at least one of CaO and BaO in a content of 1 to 39 mole %.

The dielectric composition including the above-described components according to the exemplary embodiment of the present invention is maintained at a temperature range of 825 to 950° C. for 1 to 2 hours, such that a low temperature co-fired ceramic (LTCC) process is achieved under conditions in which a relative density is 95% or more, and an over-sintering phenomenon is not generated. The process may be achieved by introducing an appropriate additive into the dielectric ceramic, and adding a glass frit as the low temperature sintering agent to the ceramic.

In addition, at least one selected from $Li_2TiO_4$, $CaSiO_3$, $ZnTiO_3$, $ZnTiO_4$, $LiBO_2$, $Li_2SiO_3$, $ZnSiO_3$, $Zn_2SiO_4$, $BaTi_4O_9$, and $Ba_2TiO_4$ may be precipitated as a secondary phase of the dielectric composition according to the exemplary embodiment of the present invention. The crystalline phase may be precipitated in the glass composition applied as the low temperature sintering agent, and may be precipitated as a secondary phase by mutual substitution between cation present in the glass and cation between the dielectric ceramics.

Further, the dielectric composition according to the exemplary embodiment of the present invention may be used in a microwave band between 300 MHz to 300 GHz frequency.

Therefore, the dielectric composition according to the exemplary embodiment of the present invention may be expected to meet the demand in the field that expansion to the microwave band is inevitably required in order to overcome a limitation in a usage frequency and allow larger demands as kinds and amounts of information become increased.

In addition, since the dielectric composition according to the exemplary embodiment of the present invention satisfies the range in which the dielectric constant is 40 to 95, the quality coefficient is 2,000 to 6,000 GHz, and the temperature coefficient of resonant frequency is −30 to +30 ppm/° C., the dielectric composition may be variously applied to elements such as a duplexer, an LC filter, and the like, in the microwave band.

Hereinafter, exemplary embodiments of the present invention will be described in detail. The examples below are described by way of an example, and are not to be construed as limiting a scope of the present invention. In addition, the examples below are exemplified using specific compounds, but it is obvious to a person skilled in the art that effects obtained by using equivalents thereof can be the same as or similar to those of the present invention.

Example

Microwave dielectric compositions having compositions as shown in the following Table 1 were prepared. Specific compositions and physical properties of glass frits included in each dielectric composition were shown in the following Table 2.

In addition, firing density and dielectric properties thereof were measured and results thereof were shown in the following Table 1. Further, the microwave dielectric compositions for the low temperature co-fired ceramic (LTCC) were fired at a temperature of 900° C. and fracture surface photographs obtained by using a scanning electron microscope (SEM) were shown in the following FIG. 1.

TABLE 1

| | Dielectric Composition | | | | | Glass Frit | | Fired Density | | Dielectric Property | |
|---|---|---|---|---|---|---|---|---|---|---|---|
| No. | Dielectric Ceramic | Mole % | Additive | Mole % | Sum (wt %) | Code [5] | wt % | Temperature (° C.) | Density (%) | K | Qxf (GHz) | Tcf (ppm/° C.) |
| LB01 | LNT[1] | 20 | BNT[2] | 80 | 85 | B10 | 15 | 875 | 96.0 | 70 | 3,000 | +8 |
| LB04 | LNT | 30 | BNT | 70 | 90 | L04 | 10 | 900 | 95.6 | 74 | 3,900 | +12 |
| LB07 | LNT | 35 | BNT | 65 | 90 | L06 | 10 | 900 | 95.3 | 72 | 3,500 | +16 |
| LB08 * | LNT | 15 | BNT | 85 | 75 | C04 | 25 | 850 | 95.2 | 38 | 1,400 | −120 |
| LZ03 | LNT | 40 | TZN[3] | 60 | 93 | L04 | 7 | 900 | 95.2 | 43 | 4,200 | +22 |
| LZ05 | LNT | 45 | TZN | 55 | 90 | C08 | 10 | 900 | 96.4 | 42 | 3,100 | +4 |
| LZ06 | LNT | 50 | TZN | 50 | 85 | L06 | 15 | 875 | 96.8 | 40 | 2,200 | −11 |
| LC07 | LNT | 70 | CT[4] | 30 | 90 | B07 | 10 | 900 | 95.4 | 89 | 2,050 | +16 |
| LC08 | LNT | 70 | CT | 30 | 85 | C04 | 20 | 900 | 97.1 | 80 | 2,000 | +9 |
| LC10 | LNT | 70 | CT | 30 | 90 | L04 | 10 | 925 | 95.5 | 94 | 2,200 | +10 |
| LC12 * | LNT | 75 | CT | 25 | 85 | B10 | 15 | 900 | 95.1 | 65 | 850 | −103 |
| LT03 | LNT | 40 | $TiO_2$ | 60 | 90 | L04 | 10 | 900 | 95.8 | 61 | 2,000 | +24 |
| LT11 | LNT | 50 | $TiO_2$ | 50 | 85 | L06 | 15 | 875 | 96.0 | 55 | 2,000 | +10 |
| LT12 | LNT | 50 | $TiO_2$ | 50 | 85 | B12 | 15 | 900 | 96.1 | 51 | 2,300 | +5 |
| LT15 * | LNT | 50 | $TiO_2$ | 50 | 77 | C08 | 23 | 900 | 95.2 | 36 | 1,300 | −75 |

[1] LNT: $Li_2Nd_2Ti_4O_{12}$
[2] BNT: $BaNd_2Ti_4O_{12}$
[3] TZN: $(Ti_{0.55}Zn_{0.15}Nb_{0.3})O_2$
[4] CT: $CaTiO_3$
[5] Codes of the glass frits are shown in the following Table 2.
* Examples beyond the range of the present invention It may be appreciated from Table 1 and FIG. 1 above that when a contained amount of the glass frit used as an additive or a low temperature sintering agent is beyond the suggested amount like the cases of Nos. LB08, LC12 and LT12, a quality coefficient which is one of the dielectric properties is deteriorated and a temperature coefficient of resonant frequency largely departs from 0. The reason is that a large amount of secondary phase is precipitated and the glass fit having a dielectric property lower than that of a ceramic is added to the composition in a large amount.

In addition, when reviewing the fractured surface of a dielectric ceramics showing good dielectric properties as shown in FIG. 1, it may be appreciated that a liquid phase is nearly filled with inner pores and two crystalline phases in a round shape and a long bar shape are mainly positioned. Therefore, a dielectric composition having desired dielectric properties depending on kinds of additives and low temperature sintering agents and a mixing ratio thereof may be designed in a lean Nox trap (LNT) dielectric ceramics shown in Table 1 above.

TABLE 2

| Code | Composition of Glass Frit (mole %) | | | | | | | Tg/Ts (°C.) | Dielectric Constant (k) | Dielectric Loss (%) |
|---|---|---|---|---|---|---|---|---|---|---|
| | $SiO_2$ | $B_2O_3$ | $Al_2O_3$ | $Li_2O$ | CaO | BaO | ZnO | | | |
| L01 | 33.2 | 31.7 | — | 32.1 | 1.0 | — | 2.0 | 450/490 | 7.1 | 0.25 |
| L04 | 23.4 | 30.4 | 4.0 | 40.0 | 1.1 | — | 2.1 | 464/491 | 7.5 | 0.17 |
| L06 | 12.3 | 31.7 | 2.6 | 25.0 | 23.4 | — | 5.0 | 450/486 | 7.7 | 0.20 |
| C04 | 16.7 | 20.9 | 1.9 | 11.5 | 38.1 | — | 10.9 | 462/508 | 7.8 | 0.18 |
| C08 | 17.0 | 29.7 | 5.0 | 43.3 | 4.0 | — | 1.0 | 409/430 | 8.0 | 0.19 |
| C09 | 13.6 | 27.6 | 3.4 | 47.7 | 4.7 | — | 3.0 | 385/416 | 8.0 | 0.24 |
| B07 | 20.1 | 32.7 | — | 11.6 | 5.0 | 18.6 | 12.0 | 470/510 | 8.1 | 0.19 |
| B10 | 15.5 | 26.8 | 2.0 | 29.6 | 7.0 | 5.0 | 14.1 | 458/500 | 8.2 | 0.23 |
| B12 | 16.4 | 24.5 | 2.0 | 29.7 | 4.5 | 10.1 | 12.8 | 453/502 | 8.3 | 0.21 |

Example

Four dielectric compositions including $_{(1-x)}A_2B_2Ti_4O_{12}$-$xTiO_2$, $_{(1-x)}A_2B_2Ti_4O_{12}$-$x(Ti_{0.55}Zn_{0.15}Nb_{0.3})O_2$, $_{(1-x)}A_2B_2Ti_4O_{12}$-$xTiO_2$-$xBaNd_2Ti_4O_{12}$, and $_{(1-x)}A_2B_2Ti_4O_{12}$-$xCaTiO_3$ were prepared as a microwave dielectric composition while changing mole ratios of x from 0 to 1.0 mole % in each composition.

Experimental Example: Evaluation on Dielectric Property

Figure 2A:
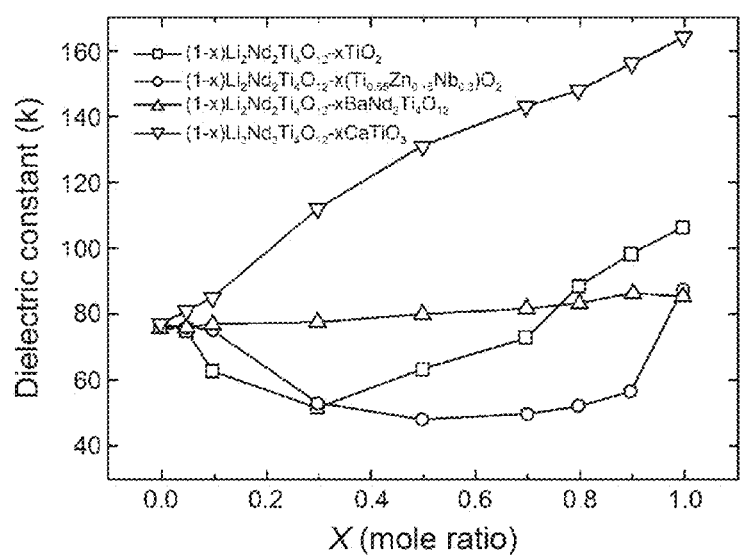
FIGS. 2A to 2C show results obtained by measuring a dielectric constant (k), a quality coefficient (Q×f), and a temperature coefficient of resonant frequency (Tcf) of the microwave dielectric composition depending on each x mole ratio.
Figure 2B:
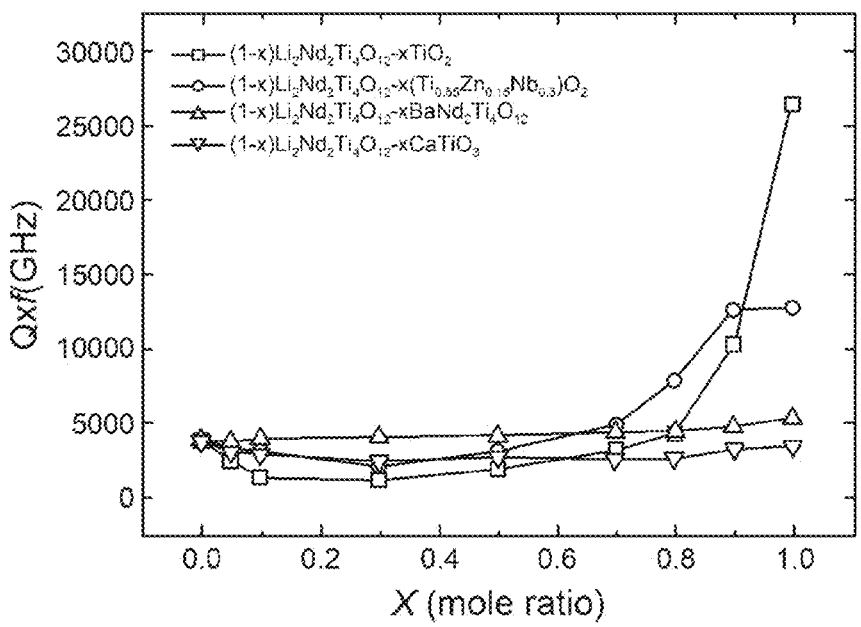
Figure 2C:
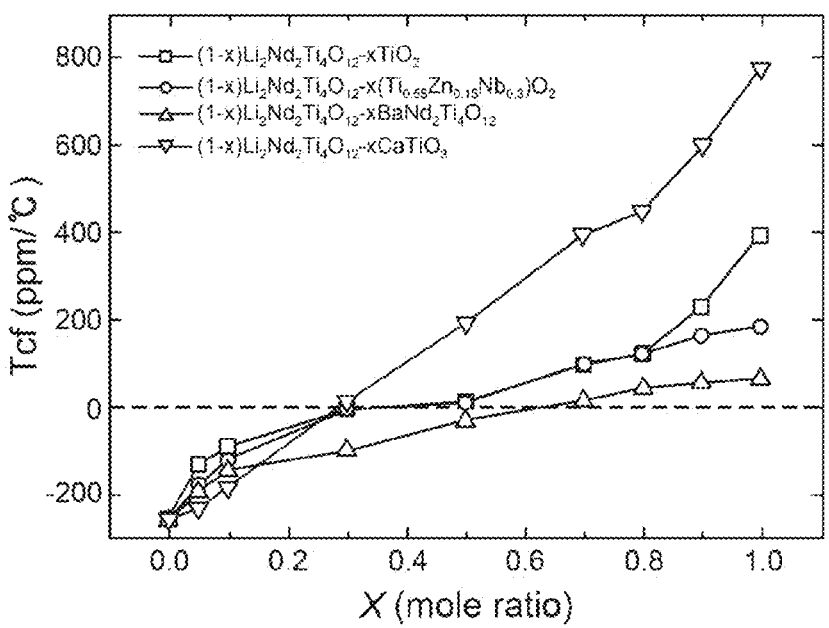

Dielectric properties such as a dielectric constant (k), a quality coefficient (Q×f) and a temperature coefficient of resonant frequency (Tcf) of the microwave dielectric according to the above example were measured and results thereof were shown in FIGS. 2A to 2C.

As shown in the results of FIGS. 2A to 2C, the dielectric composition having various dielectric properties could be prepared depending on kinds of additives and the mixing ratio thereof. As shown in FIGS. 2A and 2B, in the case in which $(Ti_{0.55}Zn_{0.15}Nb_{0.3})O_2$ or $TiO_2$ is applied to the composition as the additive, the dielectric constant and the quality coefficient are deteriorated due to precipitation of the secondary phase as compared with parent materials, and in the case in which $BaNd_2Ti_4O_{12}$ or $xCaTiO_3$ is applied to the composition, the dielectric constant and the quality coefficient are changed in a straight line depending on an added amount thereof.

Since the additive has a positive (+) temperature coefficient of resonant frequency, as the added amount of the additive becomes increased, the temperature coefficient of resonant frequency is changed from a negative (−) value to a positive (+) value. It was generally confirmed that the temperature coefficient of resonant frequency is near 0 in 0.3~0.6 mole (30 to 60 mole %).

The microwave dielectric composition according to the exemplary embodiments of the present invention may be sintered at a temperature of 825 to 950° C., and may have excellent dielectric properties to be utilized for the dielectric element or the module for the ceramic multilayered communication device used in the microwave band.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Accordingly, such modifications, additions and substitutions should also be understood to fall within the scope of the present invention.

What is claimed is:

1. A dielectric composition comprising:
a dielectric ceramic represented by the following equation:
$X_2Y_2Ti_4O_{12}$ (wherein X is Li, or Na, and Y is Nd, Sm or Bi); and
any one additive selected from $BaZ_2Ti_4O_{12}$ (wherein Z is Nd, Sm or Bi), $(Ti_{0.55}Zn_{0.15}A_{0.3})O_2$ (wherein A is Ta or V), $CaTiO_3$, and $TiO_2$.

2. The dielectric composition according to claim 1, wherein the dielectric ceramic represented by the following equation: $X_2Y_2Ti_4O_{12}$ (wherein X is Li or Na, and Y is Nd, Sm, or Bi) has a dielectric constant of 70 or more and a negative (−) temperature coefficient of resonant frequency.

3. The dielectric composition according to claim 1, wherein the additive has a dielectric constant of 70 or more and a positive (+) temperature coefficient of resonant frequency.

4. The dielectric composition according to claim 1, wherein at least one selected from $Li_2TiO_4$, $CaSiO_3$, $ZnTiO_3$, $ZnTiO_4$, $LiBO_2$, $Li_2SiO_3$, $ZnSiO_3$, $Zn_2SiO_4$, $BaTi_4O_9$, and $Ba_2TiO_4$ is precipitated as a secondary phase of the dielectric composition.

5. The dielectric composition according to claim 1, wherein the dielectric ceramic represented by the following equation: $X_2Y_2Ti_4O_{12}$ (wherein X is Li or Na and Y is Nd, Sm or Bi) is included in a content of 20 to 70 mole %, and the additive is included in a content of 30 to 80 mole %.

6. The dielectric composition according to claim 1, further comprising a low temperature sintering agent.

7. The dielectric composition according to claim 6, wherein the low temperature sintering agent is included in a content of 5 to 20 wt % based on the total dielectric composition.

8. The dielectric composition according to claim 6, wherein the low temperature sintering agent is a glass frit including $SiO_2$ and $B_2O_3$ in a sum content of 35 mole % or more, $Li_2O$ in a content of 10 to 48 mole %, ZnO in a content of 1 to 15 mole %, $Al_2O_3$ in a content of 0 to 5 mole %, and at least one of CaO and BaO in a content of 1 to 39 mole %.

9. The dielectric composition according to claim 1, wherein it is prepared by performing a low temperature co-fired ceramic (LTCC) process at a temperature range of 825 to 950° C. for 1 to 2 hours.

10. The dielectric composition according to claim 1, wherein it is used in a microwave band having a frequency range of 300 MHz to 300 GHz.

11. The dielectric composition according to claim 1, wherein a dielectric constant is in a range of 40 to 95, a quality coefficient is in a range of 2,000 to 6,000 GHz, and a temperature coefficient of resonant frequency is in a range of −30 to +30 ppm/° C.

* * * * *